April 15, 1958 L. ARNETT 2,830,528
BEVERAGE BREWING AND DISPENSING APPARATUS
Filed May 3, 1954 4 Sheets-Sheet 1

Inventor
Leslie Arnett
By
Schroeder, Hofgren, Brady & Wegner
Attorneys

April 15, 1958      L. ARNETT      2,830,528
BEVERAGE BREWING AND DISPENSING APPARATUS
Filed May 3, 1954      4 Sheets-Sheet 2

Fig. 2A.

Inventor
Leslie Arnett
By Schroeder, Hofgren, Brady & Wagner
attorneys

April 15, 1958 L. ARNETT 2,830,528
BEVERAGE BREWING AND DISPENSING APPARATUS
Filed May 3, 1954 4 Sheets-Sheet 3

Inventor
Leslie Arnett
By
Schroeder, Hofgren, Brady & Wegner
attorneys

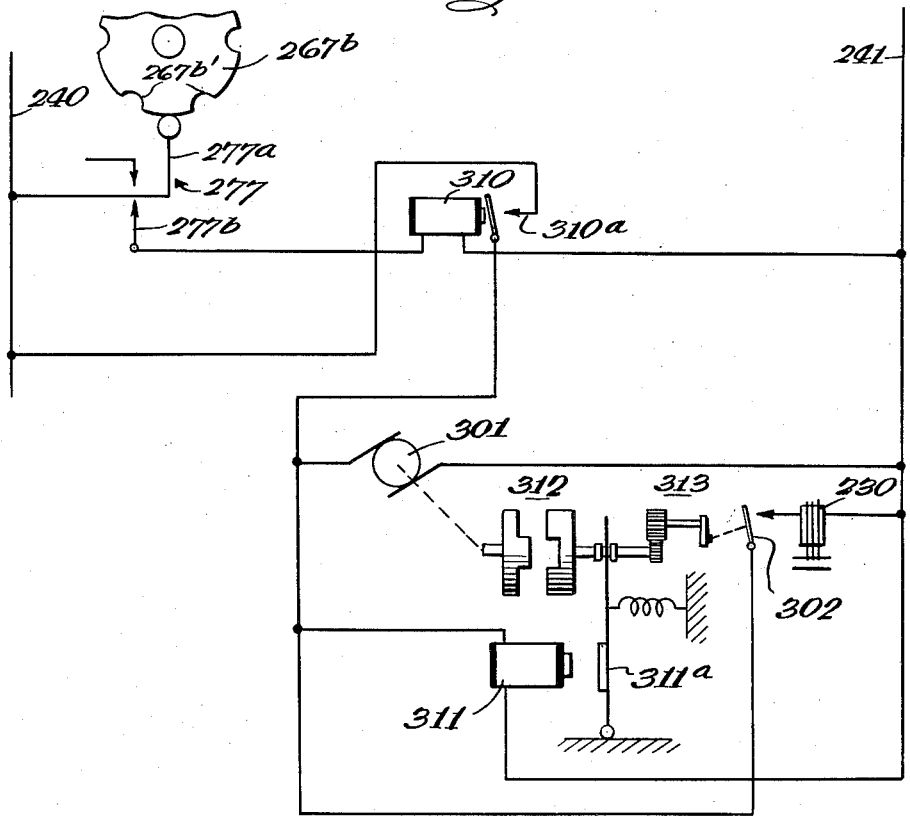

United States Patent Office 2,830,528
Patented Apr. 15, 1958

2,830,528

BEVERAGE BREWING AND DISPENSING APPARATUS

Leslie Arnett, Chicago, Ill., assignor to United Coffee Corp., a corporation of Illinois Application May 3, 1954, Serial No. 427,279

6 Claims. (Cl. 99—283)

This invention is concerned with a control and operating circuit and more particularly relates to a control and operating circuit for beverage brewing and dispensing apparatus.

I have heretofore disclosed in my copending applications, Serial No. 336,563, filed February 12, 1953, now Patent No. 2,761,200, issued September 4, 1956, and Serial No. 353,621, filed May 7, 1953, now Patent No. 2,813,965 issued November 19, 1957, both assigned to the assignee of this application, an apparatus and control circuit for preparing and dispensing a beverage such as coffee. The apparatus disclosed in these applications prepares coffee directly from the ground coffee bean in a desired quantity, stores and dispenses the brewed coffee and brews a fresh batch of coffee when it is needed. The coffee is stored in a tank which is preferably heated to maintain the coffee at the desired temperature. The brewing portion of the system utilizes percolator pots including filters which remove substantially all particles of the ground coffee bean from the infusion in order to prevent the coffee from becoming bitter during storage.

It has been found, however, that coffee kept in a heated tank for a considerable period undergoes undesired changes in flavor, usually becoming rather strong if it is stored for too long a period. Accordingly, there are situations where it is deemed desirable to provide a fresh supply of brewed coffee even though a substantial quantity remains in the storage tank.

It is a major feature of this invention to provide control apparatus in a beverage handling system which includes means for storing a beverage, means for dispensing the beverage from a storage means and means for supplying a fresh beverage, the control apparatus comprising timing means and means operable as a function of the timing means to cause the system to supply fresh beverage.

Another feature is to provide such control apparatus comprising timing means and means operable as a function of the timing means to cause operation of the dispensing means for depleting the beverage in the storage means sufficiently to cause the system to brew a fresh supply of beverage. A further feature is that in a beverage brewing and dispensing apparatus including electrically operated means for dispensing beverage, the control apparatus includes circuit means operable as a function of the timing means to open the dispensing means depleting the beverage in the storage means sufficiently to cause the system to brew a fresh supply of beverage and further means are provided which are operable as a function of the brewing means to close the dispensing means when brewing starts. Still another feature is that the last-mentioned means operates to prevent further actuation of the dispensing means through the said circuit means.

A further feature is the provision of control means in such a system operable as a function of timing means to cause the system to supply fresh beverage if fresh beverage has not been supplied for a predetermined period.

Yet another feature is the provision in such an apparatus of means operable as a function of the brewing means for resetting the timing means when brewing occurs.

Another feature is the provision, in a system including a source of heated brewing liquid, of means for temporarily disabling the heating means at predetermined intervals.

Further features and advantages will readily be apparent from the following specification and from the drawings, in which:

Figure 3 is a partial schematic diagram of a modified control circuit.

The operation of the beverage brewing and dispensing apparatus will be described briefly in order to facilitate an understanding of the invention disclosed herein. A detailed discussion of the system may be found in my aforementioned copending applications.

Figure 1:
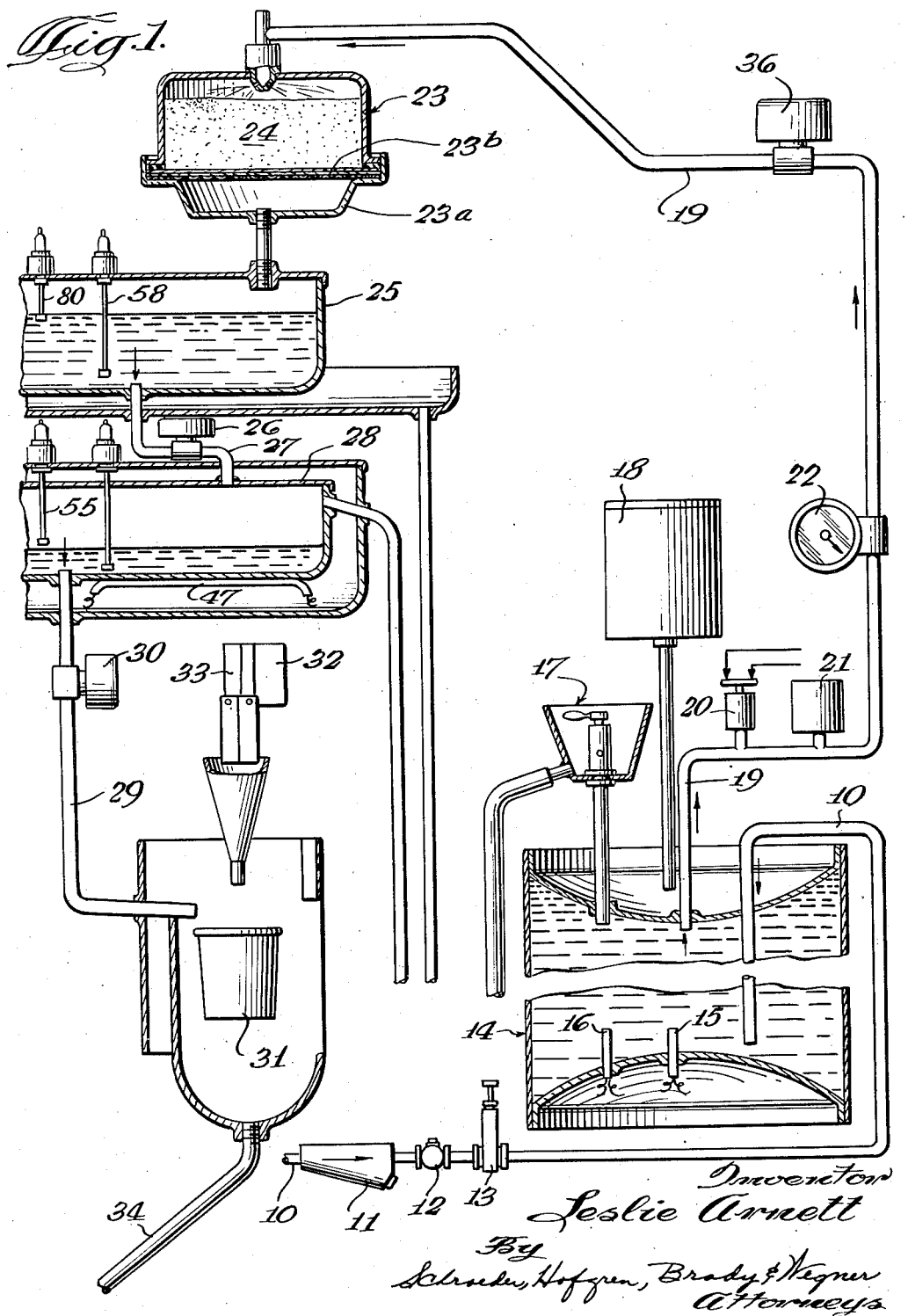
Figure 1 is a diagrammatic flow sheet illustrating the operation of a beverage brewing and dispensing system with which the control apparatus may be used.

Referring now to Figure 1, water for brewing beverage is introduced into the system from a pressurized source, such as a city water main (not shown) through an inlet pipe 10. The water passes through a strainer 11, check valve 12 and pressure reducing valve 13 into a hot water heating tank 14 wherein the water is heated to the desired brewing temperature by an electrical heating element 15, the operation of which may be controlled by a thermostatic switch 16 as will appear more fully later. A pressure and temperature actuated relief valve 17 prevents excessive heating of the water in the event of a failure of thermostatic switch 16. An air buffer tank 18 is connected to hot water tank 14 and permits complete filling thereof.

An outlet pipe 19 delivers the heated water from tank 14 to the brewing portion of the apparatus. A pressure operated switch 20 connected to outlet pipe 19 acts as a further safety in the control of heating element 15 while an electrically operated valve 21 controls the flow of water through the outlet pipe. A pressure indicator 22, in the outlet pipe 19, permits an accurate adjustment of pressure reducing valve 13 to the desired brewing pressure which may be about five pounds per square inch.

The heated water from tank 14 is conducted through outlet pipe 19 to a brewing pot 23 in which it is sprayed over ground coffee 24, the resulting infusion being collected in the lower chamber 23a of the brewing pot and conducted from there to measuring tank 25. As is explained more fully in my aforementioned copending applications, a plurality of brewing pots are provided and the selection of the one in which brewing will take place at any given time is effected by the control circuit through the operation of the desired individual pot valves, such as 36, connected in pipe 19. The structure of the percolator pot 23 is described fully in my copending application, Serial No. 371,310, filed July 30, 1953, assigned to the assignee of this application, and it will suffice for the present purposes to point out that the filter 23b includes a filter element, such as a tightly woven filter paper, which removes substantially all particles of the ground coffee bean, eliminating the principal source of bitterness in the brewed coffee.

During the brewing operation measuring tank outlet valve 26 is closed, permitting the strong first brewed coffee to be diluted by the weaker later brewed coffee. After the end of the brewing cycle, measuring tank outlet valve 26 opens and the freshly brewed coffee is transferred through pipe 27 to warming tank 28 wherein it is stored before being dispensed. Coffee is dispensed from warming tank 28 through dispensing pipe 29, the flow of coffee being controlled by dispensing valve 30. Pipe 29 delivers the coffee to a cup 31 which is suitably positioned at the end thereof and which is also positioned to receive cream and sugar from cream and sugar containers 32 and 33 if they are desired. A drain pipe 34 conducts any spillage or leakage to a waste tank (not shown).

Figure 2B:
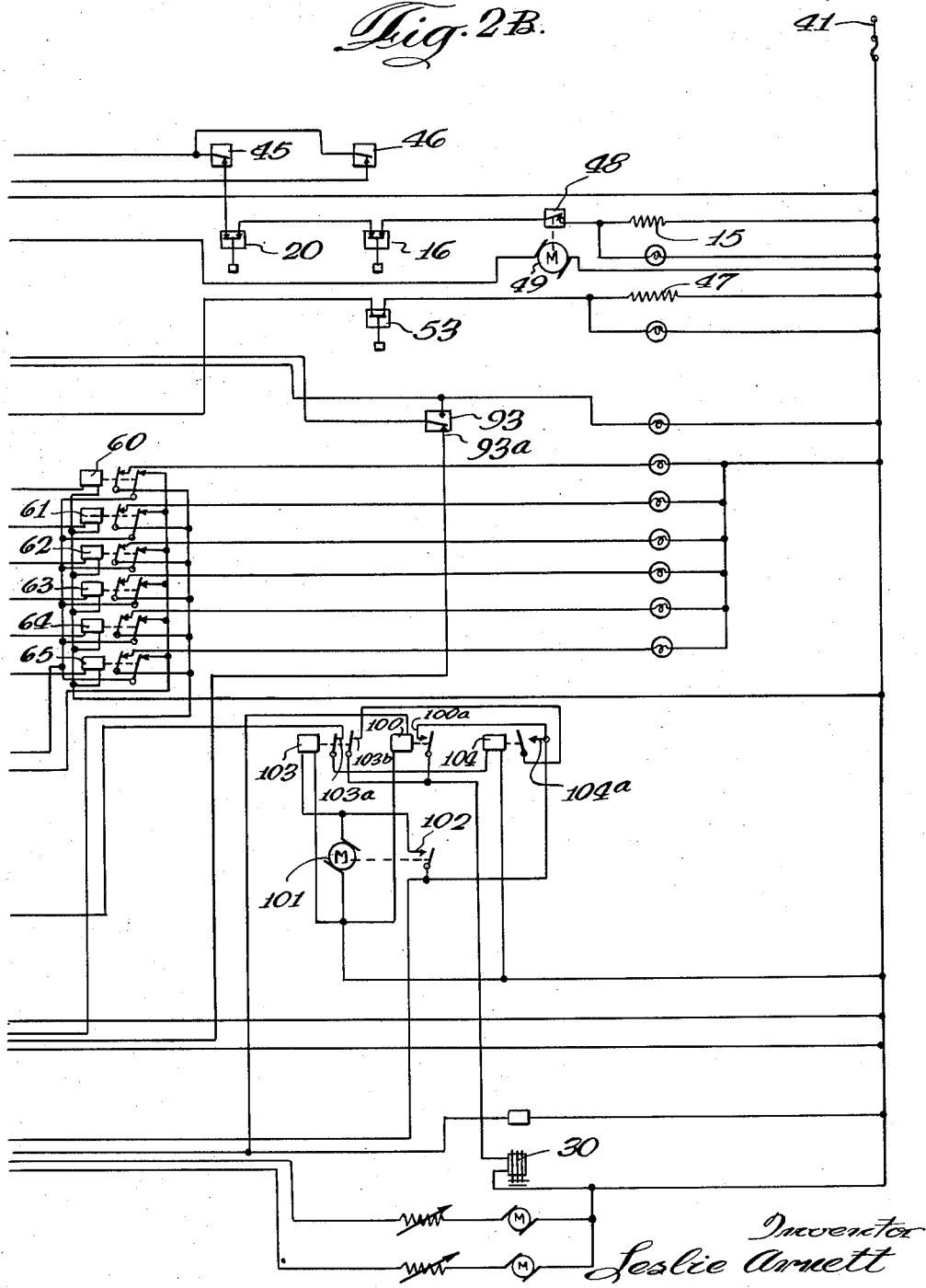
Figure 2 (comprising portions 2a and 2b) is a schematic diagram of a control circuit embodying the invention.

Reference will now be had to Figure 2 (portions 2a and 2b) in connection with a brief description of the control circuits of the brewing and dispensing apparatus. In Figure 2, letters a–x inclusive indicate leads or wires which are connected together. Again, reference may be had to my aforementioned copending applications, Serial No. 336,563, filed February 12, 1953, and Serial No. 353,621, filed May 7, 1953, for a detailed description of these circuits.

The control circuits may be energized by connecting leads 40 and 41 to a source of power, as a 110 volt A. C. line. The heating elements are energized through a pair of manual switches 45 and 46 associated with hot water tank heating element 15 and warming tank heating element 47 respectively. As mentioned before, thermostat 16 and pressure responsive switch 20 are included in the circuit of hot water tank heating element 15. In addition, a switch 48 is provided for further control of heating element 15. This switch is controlled between open and closed position by a timing motor 49 connected across the line. The timing motor may be preadjusted to disable or break the circuit of heating element 15 at predetermined intervals. The purpose of timing motor 49 and switch 48 is to conserve power by disconnecting hot water heating element 15 from the line during periods when the machine is not subject to use and accordingly there is no need for hot water. This is useful in machines which are situated in locations where demand for coffee is present only during a portion of the day, as in a factory which works only one shift.

Warming tank heating element 47 is energized through manual switch 46, wire b, contact 52a of "Sold out" relay 52, wire g and thermostat 53.

The brewing and dispensing control circuits are divided into two portions from a power standpoint, a primary portion and a secondary portion. The primary portion, which includes the dispensing circuits and a portion of the brewing circuits is energized directly from the line. The remainder of the brewing control circuits comprise the secondary portion and are energized from the output windings 54a of transformer 54, the primary winding of which is connected between line 40 and line 41 by lead q.

The brewing process is initiated when the level of beverage in warming tank 28 falls below the level of brewing start electrode 55 suspended therein and spaced above the bottom of the tank a distance such that it is uncovered when a substantial amount of coffee, say twenty-five cups, remains therein. This remaining coffee is available to serve customers while the apparatus is preparing a fresh batch. Brewing start electrode 55 is connected in series with brewing start relay 56 across the secondary winding 54a of transformer 54, the energization circuit of the relay being completed through the coffee in warming tank 28. Relay 56 has a normally closed contact 56a associated therewith which closes when electrode 55 is uncovered. (The description of switch contacts associated with relays as "normally closed" or "normally open" will be used herein to refer to the condition of these switch contacts when the various relays are not energized regardless of whether or not the relays are normally energized or normally not energized when the circuit is in operating condition.)

Connected in series with contact 56a of brewing start relay 56 is normally closed contact 57a of safety relay 57 which is energized only when there is beverage in measuring tank 25 covering electrode 58 positioned near the bottom thereof. Also connected in series with contacts 56a and 57a is normally open contact 59a associated with motor stop relay 59. The circuit continues through wire n, one or more of the normally closed contacts 60b, 61b, 63b, 64b and 65b associated with individual brewing pot relays 60, 61, 62, 63, 64 and 65 and wire o to energize drive motor 66 of a step selector switch 67.

Step switch 67 controls the sequential brewing of coffee in the various brewing pots such as 23 provided in the apparatus. The step switch includes a pair of discs 67a and 67b each of which has one or more switches associated therewith, the position of which is determined by depressions in the discs. Six individual pot switches 70, 71, 72, 73, 74 and 75 are associated with disc 67a while alternate switch 77 is associated with disc 67b. When the apparatus is not brewing coffee, which is the normal situation, plunger 77a associated with alternate switch 77 is positioned in one of the depressions 67b' of the step switch and accordingly contact 77b is open while contact 77c is closed.

Contact 77c of the alternate switch is connected in series with measuring tank outlet valve 26 across the line energizing the valve when brewing is not taking place, providing communication between measuring tank 25 and the warming tank 28. At the same time each of the individual pot switches 70, 71, 72, 73, 74 and 75 has its plunger 70a, 71a, 72a, 73a, 74a and 75a, respectively, riding on the outer periphery of disc 67a. Thus, each of the contacts 70b, 71b, 72b, 73b, 74b and 75b is closed while contacts 70c, 71c, 72c, 73c, 74c and 75c are open.

Unless trouble has developed, each of the contacts 70b, 71b, 72b, 73b, 74b and 75b of the individual pot switches is closed when brewing is not taking place and relay 59 is connected across the line closing its associated contact 59a. If for any reason something has gone wrong with the step switch and all the pot switches are not in the proper position relay 59 will not be energized and another brewing cycle cannot be initiated. Assuming that contact 59a is closed, step switch motor 66 will be energized when relay 56 is deenergized as the coffee level falls below electrode 55.

Motor 66 drives discs 67a and 67b of the step switch in a clockwise direction until the plunger associated with one of the pot switches enters depression 67a'. At this point the energizing circuit for motor 66 is broken stopping the step switch at this point (in the drawings pot switch 71 is shown with plunger 71a in depression 67a'). When the plunger 71a enters depression 67a' in addition to opening contact 71b stopping the motor 66, contact 71c closes completing the energization circuit for pot valve 36 and simultaneously energizing pot relay 64 opening the contacts associated therewith. At the same time contact 77b of alternate switch 77 is closed as plunger 77a is raised out of depression 67b' completing the energization circuit for safety valve 21 and opening contact 77c allowing dispensing tank outlet valve 26 to close.

The brewing process then begins with water flowing through pipe 19 and into the brewing pot 23 where it is sprayed over the ground coffee 24 and the resulting infusion flows into measuring tank 25. When the level of brewed coffee in measuring tank 25 covers the end of brewing stop electrode 80, brewing stop relay 81 is energized and normally open contact 81a associated therewith is closed. The closing of this contact again energizes step switch motor 66, this circuit being completed through contact 77b of alternate switch 77. The motor will again drive the discs of the step switch in a clockwise direction, the initial movement thereof raising plunger 71a of pot switch 71 out of depression 67a' opening contact 71c and closing contact 71b. This breaks the energization circuit of pot valve 36, stopping the flow of water to the brewing pot. The motor 66 continues to drive the discs until plunger 77a of alternate switch 77 enters the next depression 67b' opening contact 77b, breaking the energization circuit for the motor 66, and closing contact 77c energizing and opening measuring tank outlet valve 26 allowing the freshly brewed coffee to flow into warming tank 28.

When the supply of coffee in warming tank 28 is again depleted the brewing process will be repeated, the step switch effecting sequential brewing in each of the brewing pots provided; the next brewing being effected in the brewing pot associated with brewing pot switch 72. This process may be continued until each of the brewing pots has been used at which time all the pot relays 60, 61, 62, 63, 64 and 65, which are of the manual reset type, will have been energized and their associated contacts will be locked open. This will prevent further brewing as the brewing start energization circuit for step switch motor 66 is completed through contacts associated with these relays. In this manner the circuit automatically prevents reuse of a brewing pot in which brewing has already taken place.

Brewed coffee is dispensed from warming tank 28 by operation of dispensing valve 30 in response to the actuation of switch 90, as in response to the insertion of a coin in the dispensing apparatus. A suitable coin, when inserted in the apparatus, strikes coin switch 90 biasing it momentarily to the dotted-line position shown in Figure 2, closing contact 90a and energizing cup motor relay 91, closing contacts 91a and 91c while opening contact 91b. Relay 91 is maintained in the energized condition by holding contact 91a. Coin switch 90 then returns to the solid-line position shown, closing contact 90b.

When the apparatus is functioning normally, disabling relay 92 is maintained in an energized condition through wire s, contact 93a of cup supply switch 93, which is maintained in the position shown when cups are available in the apparatus, wire e and contact 52b of "Sold-out" relay 52. Accordingly, contacts 92a and 92b of disabling relay 92 will be closed and when coin switch 90a returns to its original position after the passing of a coin closing contact 90b, an energization circuit is completed for cup motor 93 through contact 92a and contact 91c.

Cup motor 93 causes the discharge of a cup from the cup supply in such a manner that it is properly positioned under the outlet of dispensing pipe 29. In addition to effecting the provision of a cup, cup motor 93 operates to close switches 94, 95 and 96 associated respectively with the coffee dispensing circuit, the cream dispensing circuit and the sugar dispensing circuit. Only the coffee dispensing arrangement is of interest in the present case and the others will not be described in detail.

When coffee switch 94 is closed an energizing circuit for coffee relay 100 is completed from one side of the line 40 through wire 97, switch 94 and wire v to the other side of the line 41. When this relay is energized, normally open contact 100a closes connecting dispensing valve 30 across the line through wire u. After the desired quantity of beverage has been dispensed cup motor 93 opens coffee switch 94 deenergizing relay 100 allowing contact 100a to open deenergizing dispensing valve 30. After cup motor 93 has opened switches 94, 95 and 96, it operates cup motor switch 98 opening contact 98a to deenergize cup motor relay 91 and closing contact 98b through which cup motor 93 is energized for a brief period returning the system to its original condition.

As pointed out previously, there may be certain situations in which coffee will stand in warming tank 28 for a sufficient period of time to acquire an unpleasant strength and flavor due to evaporation of the liquid. It is a primary object of this invention to provide an automatic circuit for brewing a fresh supply of coffee in such situations regardless of the amount of coffee remaining in dispensing tank 28.

An example of a situation in which this automatic rebrewing operation is desirable is in the case of a machine which is located in an environment in which it will receive little if any use over the weekend, as for example a factory or an office. In such a situation it may be wished to prepare a fresh batch of coffee at, for example, 6 a. m. on Monday so as to be ready for the morning demand. The apparatus for accomplishing this will now be described.

A timing motor 101 is provided, the operation of which may be initiated by closing switch 102 manually, connecting the motor across the line through wire u. This circuit simultaneously energizes a first relay 103 opening normally closed contacts 103a and 103b associated therewith. The operation of this circuit has no effect on normal operation of the dispensing system which acts through dispensing relays 100 or on the normal brewing operation of the system if the demand for coffee should cause rebrewing during the timing period.

The timing motor 101 may be of the synchronous type and should be adjustable to provide any desired timing period. For example, in a situation where it is desired to have fresh coffee available on Monday morning, an operator would set the timing motor for sixty-two hours and close switch 102 at 4:00 p. m. Friday. The timing motor will complete the timing period at 6:00 a. m. Monday and the brewing of a fresh batch of coffee will be effected as hereinafter described.

After the elapse of a predetermined period of time from the initiation of operation of timing motor 101 by closing switch 102, the timing motor operates to open switch 102 which is mechanically coupled thereto. This stops timing motor 101 and breaks energization circuit of relay 103 permitting contacts 103a and 103b to close. Contact 103b completes a circuit through wire u and normally closed contact 104a of a second relay 104 energizing dispensing valve 30. This permits beverage to drain from warming tank 28, such beverage being carried away through drain pipe 34. When the level of beverage in the warming tank falls below brewing start electrode 55, the brewing start cycle is initiated in the manner described above.

It will be recalled that contact 77b of alternate switch 77 closes at the start of the brewing cycle; this contact completes a circuit through wire p and contact 103a of relay 103 connecting the second relay 104 across the line, opening contact 104a and permitting dispensing valve 30 to close. This avoids a further depletion of beverage in the warming tank 28. Meanwhile, the brewing cycle proceeds in the manner described above.

The second relay 104 is of the manual reset type and contact 104a is maintained in the open position until the relay is manually tripped, an operation which will be performed at the same time the timing cycle is initiated by closing switch 102.

If the apparatus should have occasion to brew fresh coffee during the period in which the timing apparatus is operating, this is prevented from disrupting the timing system by the inclusion of contact 103a, which is open during the timing period, in the energization circuit of the second relay 104.

This timing apparatus provides a means by which the coffee standing in the warming tank may be depleted sufficiently to initiate the brewing of a fresh batch of coffee after the elapse of any predetermined period of time, within the limitations of timing motor 101, after the initiation of the timing cycle. This system does not interfere with the normal brewing and dispensing functions of the system (except during the period in which beverage is being drained from warming tank 28 at the end of the timing cycle) and in which normal brewing and dispensing operations of the system do not interfere with the timing apparatus.

A modified timing apparatus is illustrated in Figure 3 in which elements corresponding to elements in Figure 2 will be given reference numerals 200 higher than in Figure 2. Only the portions of the circuit directly pertinent to the timing portion are shown in Figure 3, it being understood that the remainder of the brewing and dispensing circuits may be identical with those shown in Figure 2.

In the timing system of Figure 3, the arrangement is such that a fresh batch of beverage will automatically be prepared a predetermined period of time, such as eight hours, after the preparation of the last batch. A timing motor 301 is connected between lines 240 and 241 through normally closed contact 310a of relay 310. An electromagnet 311 is connected in parallel with timing motor 301 and is energized whenever the motor is energized. Associated with electromagnet 311 is an armature 311a which is drawn to the electromagnet when it is energized engaging clutch mechanism 312 through which timing motor 301 drives a timing mechanism 313. Mechanically coupled to timing mechanism 313 is a timing switch 302 which is adapted to be closed after the timing mechanism has run for a predetermined period of time.

Closure of switch 302 completes the energization circuit of dispensing relay 230 draining beverage from the warming tank in a manner similar to that previously described. After a sufficient quantity of beverage has been drained from the warming tank to bring the level of beverage below the level of the brewing start electrode, the brewing cycle is initiated as heretofore described.

As disc 267b of the step switch is rotated by the step switch motor, plunger 277a of alternate switch 277 is moved out of depression 267b' closing contact 277b. This contact completes the energization circuit for relay 310 opening contact 310a, stopping timing motor 301 and breaking the energization circuit for electromagnet 311. Armature 311a of the electromagnet returns to its position as shown in the drawings disengaging the members of clutch 312 and allowing timing mechanism 313 to reset. As the timing mechanism is reset, timing switch 302 is opened, breaking the energization circuit of dispensing valve 230.

After the brewing cycle is completed disc 267b of the timing switch will again be rotated until plunger 277a of alternate switch 277 enters another depression 267b' on disc 267b. When this occurs contact 277b of alternate switch 277 will be opened breaking the energization circuit of relay 310 allowing contact 310a to close, initiating operation of the timing system. This circuit will automatically cause the preparation of a fresh batch of beverage after the elapse of a predetermined period of time from the preparation of the last batch. If brewing should occur either in response to the consumer demand prior to the elapse of the predetermined period of time or at the end of such period of time, the timing mechanism will automatically be reset and begin its cycle over again.

While I have shown and described certain embodiments of my invention, it is to be understood that it is capable of many modifications. Changes therefore, in the construction and arrangement may be made without departing from the spirit and scope of the invention as disclosed in the appended claims.

I claim:

1. Automatic beverage brewing and dispensing apparatus of the character described, comprising: beverage brewing means provided with a plurality of particulate beverage ingredient charges; an infusion pot containing a charge of particulate beverage ingredient and forming a part of said brewing means; a source of hot water under pressure for brewing fresh beverage; means for providing a connection between said infusion pot and said source of hot water; tank means for receiving brewed beverage from said infusion pot; an electrically operated valve controlling the flow of beverage from said tank means; dispensing means for serving a predetermined quantity of beverage from said tank means on each actuation; automatic electrically operated beverage brewing control means, operable as a function of the quantity of beverage in said tank means to initiate and terminate a flow of hot water from said source through said connection and into said infusion pot to prepare a quantity of fresh beverage to replenish the supply of beverage in said tank means in accordance with demand; waste receiving means; a source of power; a timing motor; a first relay connected in parallel with said motor and having two sets of normally closed contacts associated therewith; a second relay having a set of normally closed contacts associated therewith; circuit means for connecting said timing motor and said first relay to said source of power and including a manually closeable switch, said switch being opened by said timing motor after said motor has run for a predetermined length of time; circuit means connected to said source of power for energizing said dispensing valve and including one of the sets of contacts associated with said first relay and the set of contacts associated with said second relay, said first relay being deenergized at the end of said length of time causing energization of said valve, draining beverage from said storage means into said waste receiving means; and circuit means connected to said source of power for energizing said second relay and including switch means associated with said brewing means and closed when brewing starts, and the second set of contacts associated with said first relay, said second relay being energized when brewing starts opening the contact associated therewith and allowing said valve to close.

2. Apparatus of the character described in claim 1, wherein said second relay is of the manual reset type.

3. Automatic beverage brewing and dispensing apparatus of the character described, comprising: beverage brewing means provided with a plurality of particulate beverage ingredient charges; an infusion pot containing a charge of particulate beverage ingredient and forming a part of said brewing means; a source of hot water under pressure for brewing fresh beverage; means providing a connection between said infusion pot and said source of hot water; tank means for receiving brewed beverage from said infusion pot; outlet conduit means connected to said tank means; an electrically operated valve in said conduit means for controlling the flow of beverage from said tank means; dispensing means for serving a predetermined quantity of beverage from said tank means on each actuation; automatic electrically operated beverage brewing control means operable as a function of the quantity of beverage in said tank means to initiate and terminate a flow of hot water from said source through said connection and into said infusion pot to prepare a quantity of fresh beverage to replenish the supply of beverage in said tank means in accordance with demand; waste receiving means for receiving waste beverage from said outlet conduit means; a timer; a circuit for energizing said electrically operated valve and including a normally open switch; and means responsive to said timer to close said normally open switch, thereby opening said valve and emptying said tank means into said waste receiving means and to actuate said brewing control means to provide fresh beverage.

4. Automatic beverage brewing and dispensing apparatus of the character described, comprising: beverage brewing means provided with a plurality of particulate beverage ingredient charges; an infusion pot containing a charge of particulate beverage ingredient and forming a part of said brewing means; a source of water under pressure for brewing fresh beverage; means providing a connection between said infusion pot and said source of water; tank means for receiving brewed beverage from said infusion pot; dispensing means for serving a predetermined quantity of beverage from said tank means on each actuation; automatic, electrically operated beverage brewing control means, operable as a function of the quantity of beverage in said tank means to initiate and terminate a flow of hot water from said source through said connection and into said infusion pot to prepare a quantity of fresh beverage to replenish the supply of beverage in said tank means in accordance with demand; waste receiving means; a timer; and means operable as a function of said timer to empty said tank means into said waste receiving means and to actuate said brewing control means to provide fresh beverage.

5. Automatic beverage brewing and dispensing apparatus of the character described, comprising: beverage brewing means provided with a plurality of particulate beverage ingredient charges; an infusion pot containing a charge of particulate beverage ingredient and forming a part of said brewing means; a source of hot water under pressure for brewing fresh beverage; means providing a connection between said infusion pot and said source of hot water; tank means for receiving brewed beverage from said infusion pot; an electrically operated valve controlling the flow of beverage from said tank means; dispensing means for serving a predetermined quantity of beverage from said tank means on each actuation; automatic, electrically operated beverage brewing control means, operable as a function of the quantity of beverage in said tank means to initiate and terminate a flow of hot water from said source through said connection and into said infusion pot to prepare a quantity of fresh beverage to replenish the supply of beverage in said tank means in accordance with demand; waste receiving means in said apparatus; a source of power; a timing motor; a timing motor reset relay having a set of normally closed contacts associated therewith; circuit means connecting said motor to said source of power and including said contacts; circuit means connecting said valve to said source of power and including a normally open switch controlled by said motor, said switch being closed by said motor after the motor has run continuously for a predetermined length of time to open said valve emptying said tank means into said waste receiving means and actuating said brewing control means to provide fresh beverage; and circuit means connecting said relay to said source of power and including switch means associated with said brewing means and closed when brewing starts.

6. Automatic beverage brewing and dispensing apparatus of the character described, comprising: beverage brewing means provided with a plurality of particulate beverage ingredient charges; an infusion pot containing a charge of particulate beverage ingredient and forming a part of said brewing means; a source of hot water under pressure for brewing fresh beverage; means providing a connection between said infusion pot and said source of hot water; tank means for receiving brewed beverage from said infusion pot; dispensing means for serving a predetermined quantity of beverage from said tank means on each actuation; automatic, electrically operated beverage brewing control means, operable as a function of the quantity of beverage in said tank means to initiate and terminate a flow of hot water from said source through said connection and into said infusion pot to prepare a quantity of fresh beverage to replenish the supply of beverage in said tank means in accordance with demand; waste receiving means in said apparatus; a timer; means for initiating operation of said timing means; means operable as a function of said timing means to empty said tank means into said waste receiving means and to actuate said brewing control means to provide fresh beverage after the elapse of a predetermined period of time from the initiation of the operation of said timing means; and means responsive to the operation of said brewing means for resetting said timing means.

References Cited in the file of this patent

UNITED STATES PATENTS

| | | |
|---|---|---|
| Re. 23,830 | Mojonnier | May 18, 1954 |
| 376,651 | Hexamer | Jan. 18, 1888 |
| 1,513,685 | Ardovino | Oct. 28, 1924 |
| 1,621,620 | Bast | Mar. 22, 1927 |
| 1,809,899 | Heroy | June 16, 1931 |
| 1,822,433 | Brand | Sept. 8, 1931 |
| 1,869,720 | Strand et al. | Aug. 2, 1932 |
| 2,013,172 | Petrone | Sept. 3, 1935 |
| 2,166,683 | Grayson | July 18, 1939 |
| 2,462,019 | Bowman | Feb. 15, 1949 |
| 2,517,073 | Alvarez | Aug. 1, 1950 |
| 2,610,284 | Kolisch | Sept. 9, 1952 |
| 2,657,628 | Stoeser | Nov. 3, 1953 |